(12) United States Patent
Björklund

(10) Patent No.: US 8,817,444 B2
(45) Date of Patent: Aug. 26, 2014

(54) CONTROL ARRANGEMENT

(75) Inventor: Hans Björklund, Ludvika (SE)

(73) Assignee: ABB Technology AG, Zürich (CH)

( * ) Notice: Subject to any disclaimer, the term of this patent is extended or adjusted under 35 U.S.C. 154(b) by 125 days.

(21) Appl. No.: 13/823,570

(22) PCT Filed: Jun. 4, 2010

(86) PCT No.: PCT/EP2010/057841
§ 371 (c)(1), (2), (4) Date: Apr. 4, 2013

(87) PCT Pub. No.: WO2011/150975
PCT Pub. Date: Dec. 8, 2011

(65) Prior Publication Data
US 2013/0215556 A1    Aug. 22, 2013

(51) Int. Cl.
*H01H 73/00* (2006.01)
*H02J 11/00* (2006.01)
*H01H 33/59* (2006.01)
*H01H 9/56* (2006.01)

(52) U.S. Cl.
CPC ............... *H02J 11/00* (2013.01); *H01H 33/593* (2013.01); *H01H 9/56* (2013.01); *H01H 33/596* (2013.01)
USPC ............................................ 361/115; 361/62

(58) Field of Classification Search
USPC .................................................. 361/62, 115
See application file for complete search history.

(56) References Cited

U.S. PATENT DOCUMENTS

| | | | |
|---|---|---|---|
| 4,631,627 A | 12/1986 | Morgan | |
| 5,361,184 A | 11/1994 | El-Sharkawi et al. | |
| 5,638,296 A | 6/1997 | Johnson et al. | |
| 6,018,451 A * | 1/2000 | Lyke et al. | 361/93.2 |
| 6,507,273 B1 | 1/2003 | Chang et al. | |
| 8,649,147 B2 * | 2/2014 | Schlotterer et al. | 361/115 |

FOREIGN PATENT DOCUMENTS

EP     2 071 701 A1    6/2009

* cited by examiner

*Primary Examiner* — Rexford Barnie
*Assistant Examiner* — Tien Mai
(74) *Attorney, Agent, or Firm* — Birch, Stewart, Kolasch & Birch, LLP

(57) ABSTRACT

A control arrangement for a circuit breaker station includes a central control system and, for each of the circuit breakers, a circuit breaker operating unit connected to the central control system to obtain switching instructions and to the respective circuit breaker to control the operation thereof. The central control system and the circuit breaker operating units each have a local clock that are synchronized with one another. The central control system is, during use, arranged to calculate a point of time for switching each of the circuit breakers based on measured voltages, currents, and circuit breaker positions, and to send the point of time in a switching instruction to the circuit breaker operating unit. Each of the circuit breaker operating units is arranged to switch the circuit breaker, to which it is connected, at the point of time which is received in the switching instruction from the central control system.

20 Claims, 2 Drawing Sheets

CONTROL ARRANGEMENT

TECHNICAL FIELD OF THE INVENTION

The present invention relates to a control arrangement for a circuit breaker station or substation.

DESCRIPTION OF RELATED ART AND BACKGROUND OF THE INVENTION

Voltage and current transients generated during switching of high voltage circuit breakers are of increasing concern for the electric utility industry. These concerns include both power quality issues for voltage-sensitive customer loads, and excessive stresses on power system equipment. Conventional solutions for reducing switching transients include circuit breaker pre-insertion devices such as resistors or inductors and fixed devices such as arresters and current limiting reactors. While these solutions provide some degree of mitigation, they require additional equipment, increase costs and are accompanied by reliability concerns.

A superior approach to reduced switching transients is synchronous switching, sometimes referred to as point-on-wave switching. Synchronous switching is performed by a synchronization device, which—upon receiving a close (or trip) command—delays the switching of the circuit breaker by a selected period of time such that current inception (or contact separation) coincides with a certain point on the voltage wave, known to reduce switching transients. For instance, for connecting shunt capacitor banks, the circuit breaker is preferably switched in at voltage zero crossing.

FIG. 1 illustrates schematically, partly in a block diagram, partly in a circuit diagram, a portion of a circuit breaker station in which a control arrangement based on the above approach is implemented. The circuit breaker station 101 comprises, for each phase, a plurality of circuit breakers 104, 105, 106, voltage measuring devices 107, 108 for measuring voltages of bus bars 102, 103, current measuring devices 109, 110, 111 for measuring currents at terminals of the circuit breakers 104, 105, 106, and, for each circuit breaker, a circuit breaker position indicating device 112 for indicating the position of the circuit breaker. Such position indication devices are often an integral part of the respective breaker operating mechanism. However, for reasons of clarity only one circuit breaker position indicating device 112 is illustrated in FIG. 1. The control arrangement comprises a central control system 113 for the overall control of the circuit breaker station 101, the central control system 113 being connected to the voltage measuring devices 107, 108, the current measuring devices 109, 110, 111, and the circuit breaker position indicating devices 112 to obtain measured voltages, currents, and circuit breaker positions from there. The connections are only schematically indicated by reference numerals 114, 115, 116 at the central control system end.

For each of the circuit breakers 104, 105, 106, there is provided a synchronization device 117 connected to the central control system 113 via connection 118 to obtain switching instructions, and to the respective circuit breaker 104, 105, 106 via connection 119 to control the operation thereof. The synchronization device may e.g. be the Switchsync™ Controller commercially available from ABB. Further, each of the synchronization devices 117 is connected to one or several voltage measuring devices 107, 108, to at least some of the current measuring devices 109, 110, 111, and to the circuit breaker position indicating device 112 to obtain a measured voltage, measured currents, and a measured circuit breaker position from there. The connections are indicated by reference numerals 120, 121, 122, 123, wherein connection 120 has a voltage selector for selecting which of the bus bar voltages that should be forwarded to the synchronization device 117. Note that for reasons of clarity only one synchronization device 117 is illustrated in FIG. 1. Similarly, for reasons of clarity only the connections 118-123 to and from the illustrated synchronization device 117 are indicated in FIG. 1.

Each of the synchronization devices 117 is arranged to determine a switching delay for the circuit breaker 105, to which it is connected, based on the obtained voltage, currents, and circuit breaker position, and to switch the circuit breaker 105 after the determined delay in response to receiving a switching instruction from the central control system 113. Depending on whether the circuit breaker 105 closes or opens in the switching operation, and depending on the type of load (shunt capacitor banks, shunt reactors, transformers, transmission lines, etc.), the switching operation should be performed such that current inception (or contact separation) coincides with a certain point on the voltage wave. As an example, the synchronization devices 117 may be configured to close at voltage zero crossing.

SUMMARY OF THE INVENTION

While the control arrangement described above can reduce inrush currents or repercussions to non-critical values, it has nevertheless some drawbacks. It requires for each synchronization device considerable amount of cabling. Each synchronization device needs to be fed with the same voltage reference, i.e. a bus bar voltage. The more circuit breakers that are present in the circuit breaker station or substation, the more cabling is required, and it will be cumbersome to provide each of the synchronization devices with the correct signals.

Further, in circuit breaker stations or substations with complex bus structures, complex selection arrangements with relays may be required to select correct bus voltage for the synchronization.

Still further, in circuit breaker stations or substations using distributed units to operate the breakers using a process bus such as e.g. IEC61850-9-2 or other Ethernet based field bus such as EtherCat, it would be difficult to provide the distributed synchronization units with the synchronization function (point-of-wave switching function) as the synchronization function would require voltages and currents to be sent downstream the process bus to the distributed synchronization devices. This may restrict the bus structures possible to use and complicates the engineering efforts.

Accordingly, it is an object of the present invention to provide a control arrangement for a circuit breaker station which addresses the above issues.

It is a particular object of the invention to provide a control arrangement for a circuit breaker station, which requires a minimum of cabling.

It is a further object of the invention to provide such a control arrangement, which relaxes the requirements on the distributed units that operate the circuit breakers.

It is yet a further object of the invention to provide such a control arrangement, which is robust, reliable, and of low cost.

These objects among others are, according to the present invention, attained by control arrangements as claimed in the appended patent claims.

According to one aspect of the invention there is provided a control arrangement for a circuit breaker station including a central control system for the overall control of the circuit breaker station, and, for each of the circuit breakers, a circuit breaker operating unit connected to the central control system to obtain switching instructions, and to the respective circuit breaker to control the operation thereof. The central control system and the circuit breaker operating units have each a local clock, all clocks being synchronized with one another. The central control system is, during use, arranged to calculate a point of time for switching each of the circuit breakers based on selected ones of the measured voltages, currents, and circuit breaker positions, and recorded operating times for that particular circuit breaker and in the case of single pole breaker mechanisms, for that particular phase, and to send the point of time in a switching instruction to the circuit breaker operating unit. Each of the circuit breaker operating units is arranged to switch the circuit breaker, to which it is connected, at the point of time which is received in the switching instruction from the central control system.

By such control arrangement, the precise absolute time to switch (close or open) each of the circuit breakers is calculated in the central control system, which includes a computer that is already provided with all required signals, i.e. voltages, currents, and circuit breaker position indications. These absolute times can be communicated to the distributed circuit breaker operating units, which may each be a simple IED (intelligent electronic device) or an I/O board, arranged in close vicinity of, or within, the respective circuit breaker.

The circuit breaker operating units can thus be cheap and simple and no complex cabling is required; for each unit only one connection to the central control system and one connection to the circuit breaker are required. Preferably, the central control system and the circuit breaker operating units communicate via a process bus such as e.g. IEC61850 or other Ethernet based field bus such as EtherCat.

Since the calculations for many circuit breakers in the station are performed in a single computer, this device can have much higher calculation capacity than the calculation capacity of the prior art synchronization devices without increasing the cost. This in turn, allows much more complex algorithms to be used to determine the correct switching instances. Examples of such algorithms are remanence calculations for switching of transformers, operating time predictions for the circuit breaker based on current, previous temperatures, station battery voltages, and statistical analysis of earlier operations of the circuit breaker and similar circuit breakers in the station.

A prerequisite for the present invention is that each of the circuit breaker operating units has a local clock which is properly synchronized with the clock of the central control system. This is, however, easily accomplished by using e.g. an IEC61850 process buss in combination with the PTP (precision time protocol) in accordance with IEEE1588. Alternatively, EtherCat, which has built-in node synchronization, could be used.

Additionally, according to further aspects of the invention there are provided a circuit breaker station which comprises the control arrangement described above and an HVDC system which comprises a circuit breaker arrangement with the control arrangement described above.

Further characteristics of the invention, and advantages thereof, will be evident from the following detailed description of preferred embodiments of the present invention given hereinafter and the accompanying FIGS. 1-2, which are given by way of illustration only, and are thus not limitative of the present invention.

DETAILED DESCRIPTION OF EMBODIMENTS

Figure 1:
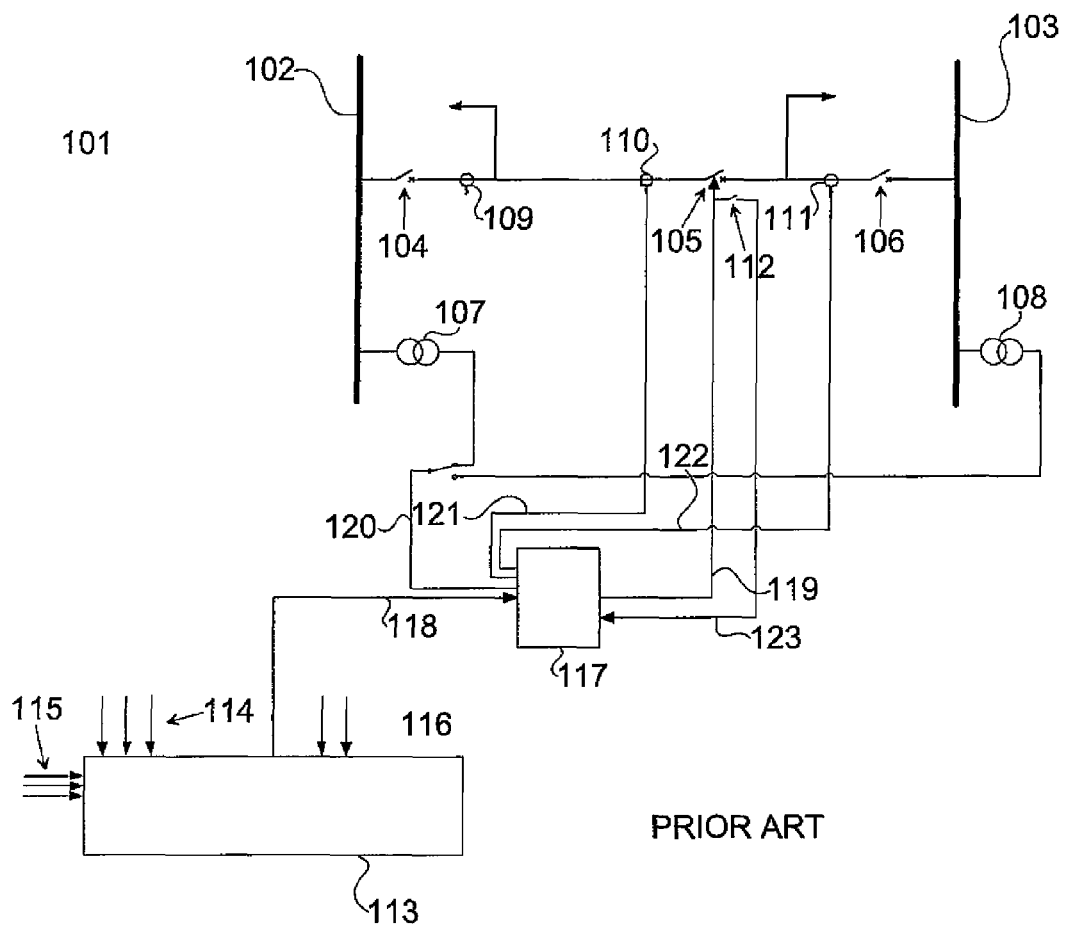
FIG. 1 illustrates schematically, partly in a block diagram, partly in a circuit diagram, a portion of a circuit breaker station in which a control arrangement according to prior art is implemented.
Figure 2:
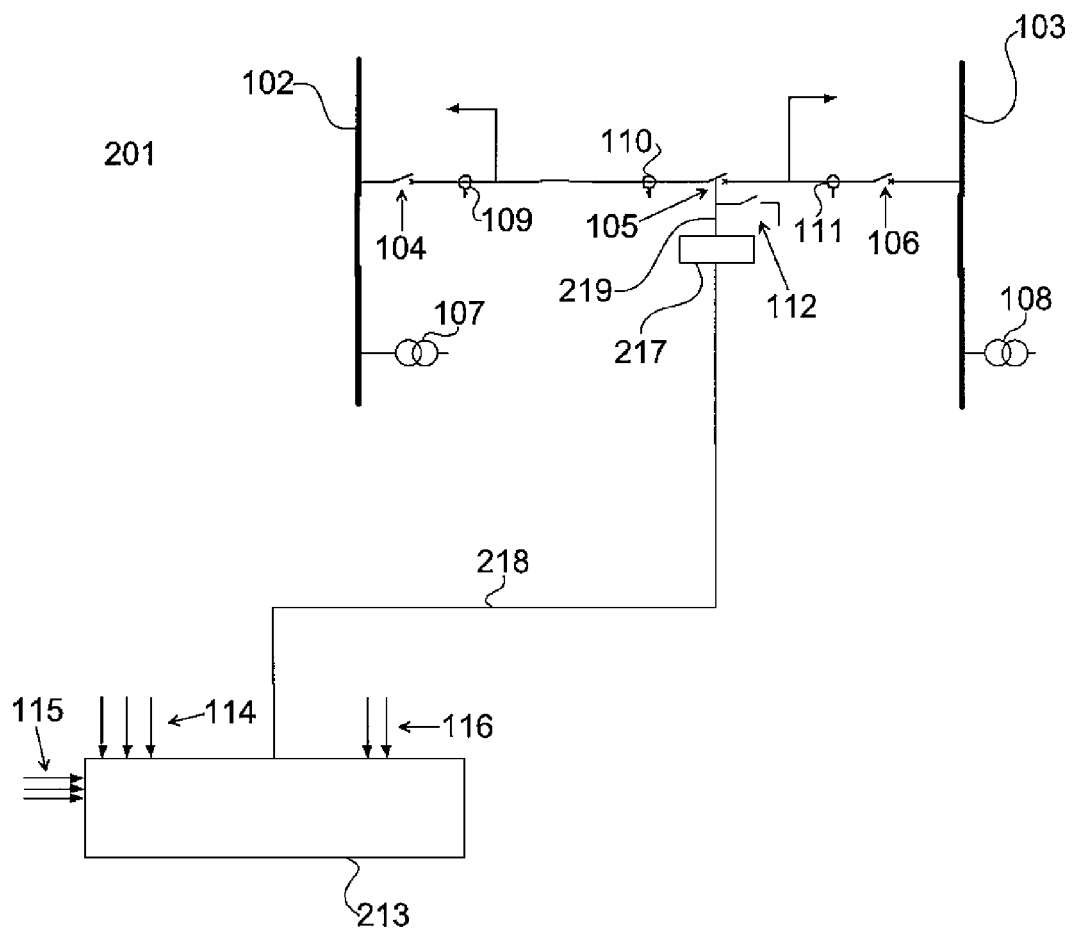
FIG. 2 illustrates schematically, partly in a block diagram, partly in a circuit diagram, a portion of a circuit breaker station in which a control arrangement according to an embodiment of the present invention is implemented.

FIG. 2 illustrates schematically, partly in a block diagram, partly in a circuit diagram, a portion of a circuit breaker station in which a control arrangement according to an embodiment of the present invention is implemented.

The circuit breaker station 201 comprises a plurality of circuit breakers 104, 105, 106, voltage measuring devices 107, 108 for measuring voltages of bus bars 102, 103, current measuring devices 109, 110, 111 for measuring currents through the circuit breakers 104, 105, 106, and, for each circuit breaker 104, 105, 106, a circuit breaker position indicating device 112 for indicating the position of the circuit breaker 104, 105, 106. Note that for reasons of clarity only one circuit breaker position indicating device 112 is illustrated in FIG. 2.

The control arrangement according to an embodiment of the invention comprises a central control system 213 for the overall control of the circuit breaker station 201. The central control system 213 is connected to the voltage measuring devices 107, 108, current measuring devices 109, 110, 111, and circuit breaker position indicating devices 112 to obtain measured voltages, currents, and circuit breaker positions from there. The connections are only schematically indicated by reference numerals 114, 115, 116 at the central control system end.

For each of the circuit breakers 104, 105, 106, a circuit breaker operating unit 217 is connected to the central control system 213 via a process fieldbus system 218 to obtain switching instructions from there. It is further connected to the respective circuit breaker 104, 105, 106 to control the operation thereof.

The circuit breaker operating units 217 are each an IED (intelligent electronic device) or an I/O board, which is arranged within the circuit breaker 105 to which it is connected, in a junction box, or in a control room (not illustrated). The circuit breaker operating units can be much simpler and thus cheaper than the corresponding synchronization devices of the prior art. Further, the circuit breaker operating units 217 need less connections and cabling as compared to the synchronization devices. For each of the circuit breaker operating units 217 only two connections are required; one connection to the process fieldbus system 218 and one connection to the circuit breaker 105.

The process fieldbus system is preferably an IEC61850 system, provided with precision time protocol (PTP), or an EtherCat system.

This provides for clock synchronization between the central control system 213 and the circuit breaker operating units 217. The present invention requires explicitly that the central control system 213 and the circuit breaker operating units 217 have each a clock, wherein all clocks are synchronized with one another.

The central control system 213 is, during use, arranged to calculate a future absolute point of time for switching each of the circuit breakers 104, 105, 106 based on the measured voltages, currents, circuit breaker positions, and measured operating times for earlier operations, and to send this point of time in a switching instruction to the circuit breaker operating unit 217 connected to the circuit breaker 104, 105, 106, and each of the circuit breaker operating units 217 is, during use, arranged to switch the circuit breaker 104, 105, 106, to which it is connected, at the point of time which is received in the switching instruction from the central control system 213.

In particular, the present invention is aimed for switching in various objects such as ac harmonic filters, shunt capacitor banks, shunt reactors, transformers, or transmission lines.

Capacitor banks are used to compensate the loss of reactive power in power grids having long distance between generation and consumption with variable loads. Switching these banks causes transients which in turn causes problems on the power grid. The present invention provides that these banks can be switched at voltage zero crossing to reduce the transients to non-critical values. Controlled switching in of shunt reactors are used to minimize inrush currents. Controlled transformer closing is used to minimize inrush currents. Controlled switching of transmission lines minimizes switching transients.

Thus, the central control system 213 is, during use, arranged to calculate a future point of time for closing a circuit breaker 105 in response to the measured voltages, currents, circuit breaker positions, and measured operating times for earlier operations, and to send that point of time in a circuit breaker closing instruction to the circuit breaker operating unit 217 connected to the circuit breaker 105. The circuit breaker operating unit 217 is then arranged to close the circuit breaker 105 at the point of time which is received in the closing instruction from the central control system 213.

However, the invention may also be applied for disconnecting objects, in particular if the opening of the circuit breakers 104, 105, 106 can be performed fast and in a controlled manner. Controlled opening of circuit breakers may be performed e.g. in order to reduce switching transients in the power grid, to reduces wear and tear of the circuit breakers, and in case transformers are disconnected, the controlled opening may decide the direction of the residual flux, which supports the determination of a later performed controlled closing.

The invention encompasses also the entire circuit breaker station 201 comprising the control arrangement disclosed above and also an HVDC system comprising the circuit breaker station 201.

It shall be appreciated that the circuit breaker station 201 may comprise many more circuit breakers than illustrated and/or circuit breakers in other bay configurations. There may also be many more control systems in a complete station.

It shall be appreciated that the present invention can also be applied for line switching. In order to obtain optimum line switching with a minimum of disturbances also knowledge of the line voltage is necessary to calculate the point of time of the switching. This can be obtained by using phasors to transfer the information from the other side of the line.

The invention claimed is:

1. A control arrangement for a circuit breaker station including a plurality of circuit breakers, voltage measuring devices for measuring bus bar voltages, current measuring devices for measuring currents through the circuit breakers, and, for each circuit breaker, a circuit breaker position indicating device for indicating the position of the circuit breaker, the control arrangement comprising:

a central control system for the overall control of the circuit breaker station, the central control system being, during use, connected to the voltage measuring devices, current measuring devices, and circuit breaker position indicating devices to obtain measured voltages, currents, and circuit breaker positions; and for each of the circuit breakers, a circuit breaker operating unit connected, during use, to the central control system to obtain switching instructions, and to the respective circuit breaker to control the operation thereof, wherein the central control system and the circuit breaker operating units have each a local clock, wherein all clocks are synchronized with one another;

the central control system is, during use, arranged to calculate a point of time for switching each of the circuit breakers based on the obtained measured voltages, currents, and circuit breaker positions, and earlier operating times for the circuit breaker, and to send said point of time in a switching instruction to said circuit breaker operating unit; and each of the circuit breaker operating units is, during use, arranged to switch the circuit breaker, to which it is connected, at the point of time which is received in the switching instruction from the central control system.

2. The control arrangement of claim 1 wherein the central control system is, during use, arranged to calculate a point of time for closing each of the circuit breakers based on the obtained measured voltages, currents, and circuit breaker positions, and earlier operating times for said switching operations, and to send said point of time in a circuit breaker closing instruction to said circuit breaker operating unit; and each of the circuit breaker operating units is, during use, arranged to close the circuit breaker, to which it is connected, at the point of time which is received in the closing instruction from the central control system.

3. The control arrangement of claim 1 wherein at least one of the circuit breaker operating units is, during use, arranged to switch the circuit breaker, to which it is connected, to connect or disconnect an ac harmonic filter, a shunt capacitor bank, a shunt reactor, a transformer, or a transmission line.

4. The control arrangement of claim 1 wherein at least one of the circuit breaker operating units is, during use, arranged to switch the circuit breaker at voltage zero crossing.

5. The control arrangement of claim 1 wherein the central control system and the circuit breaker operating units are connected via a process fieldbus system.

6. The control arrangement of claim 5 wherein said process fieldbus system is an IEC61850 system, optionally provided with precision time protocol, or an EtherCat system.

7. The control arrangement of claim 1 wherein the circuit breaker operating units are each an IED or an I/O board.

8. The control arrangement of claim 1 wherein the circuit breaker operating units are each arranged within the circuit breaker to which it is connected, in a junction box, or in a control room.

9. A circuit breaker station comprising the control arrangement of claim 1.

10. An HVDC system comprising the circuit breaker station of claim 9.

11. The control arrangement of claim 2 wherein at least one of the circuit breaker operating units is, during use, arranged to switch the circuit breaker, to which it is connected, to connect or disconnect an ac harmonic filter, a shunt capacitor bank, a shunt reactor, a transformer, or a transmission line.

12. The control arrangement of claim 2 wherein at least one of the circuit breaker operating units is, during use, arranged to switch the circuit breaker at voltage zero crossing.

13. The control arrangement of claim 3 wherein at least one of the circuit breaker operating units is, during use, arranged to switch the circuit breaker at voltage zero crossing.

14. The control arrangement of claim 2 wherein the central control system and the circuit breaker operating units are connected via a process fieldbus system.

15. The control arrangement of claim 3 wherein the central control system and the circuit breaker operating units are connected via a process fieldbus system.

16. The control arrangement of claim 4 wherein the central control system and the circuit breaker operating units are connected via a process fieldbus system.

17. The control arrangement of claim 2 wherein the circuit breaker operating units are each an IED or an I/O board.

18. The control arrangement of claim 3 wherein the circuit breaker operating units are each an IED or an I/O board.

19. The control arrangement of claim 4 wherein the circuit breaker operating units are each an IED or an I/O board.

20. The control arrangement of claim 5 wherein the circuit breaker operating units are each an IED or an I/O board.

* * * * *